Oct. 18, 1938.   N. A. CRAIGUE   2,133,810

METHOD FOR THE PRODUCTION OF CELLULOSIC STRUCTURES

Filed Jan. 9, 1936

INVENTOR.
Norman A. Craigue
BY Charles F. Daley
ATTORNEY

Patented Oct. 18, 1938

2,133,810

UNITED STATES PATENT OFFICE 2,133,810

METHOD FOR THE PRODUCTION OF CELLULOSIC STRUCTURES

Norman A. Craigue, Kenmore, N. Y., assignor, by mesne assignments, to E. I. du Pont de Nemours & Company, Wilmington, Del., a corporation of Delaware Application January 9, 1936, Serial No. 58,355

4 Claims. (Cl. 18—48)

This invention relates to the manufacture of porous masses and more particularly it relates to methods and apparatus for the production of porous cellulosic masses, such as, for example, artificial sponges. The invention will be described with particular reference to the manufacture of sponges from viscose, however, the invention in its broad aspect is applicable to the production of all types of flexible, porous masses from solutions or dispersion of substances or compositions which are coagulable by means of heat, particularly aqueous cellulosic solutions or dispersions.

Heretofore in the manufacture of artificial sponges it has been customary to mix an aqueous cellulosic material such as viscose with a soluble or fusible pore-forming material, such as crystals of sodium sulfate decahydrate of suitable size, together with a fibrous strength-giving material such as fibers of cotton, hemp, flax or rayon. The mixture is introduced into suitable molds of any desired shape and subjected to a coagulating and/or regenerating action. The coagulated mass is removed from the molds and washed and purified, for example, in the manner disclosed in the co-pending application of T. F. Banigan, Serial No. 26,082. The sponge mass is then dried and cut up into sponge blocks of the desired size.

The coagulation of sponge masses has heretofore been attended by serious difficulties. It is essential from an economic viewpoint to mold and coagulate the sponge masses in comparatively large aggregates. Prior to the present invention these large sponge masses were usually coagulated by one of several methods, namely, by immersion in a liquid, for example acid, coagulating bath, or by the external application of heat, such as by immersion in a boiling salt solution. All these commonly known methods were objectionable in that it was impossible to obtain satisfactory uniformity of coagulation throughout the sponge mass.

When acid coagulating baths, such as sulfuric acid, are used for the coagulation of sponge masses it is extremely difficult to penetrate into the interior of the masses. For example, when a sulfuric acid bath is used for the coagulation of a viscose sponge mass, it will take several days to accomplish a satisfactory and complete coagulation of the mass. Furthermore, coagulation of a viscose sponge mass with sulfuric acid is objectionable in that although the resulting mass will contain a sufficient number of macroscopic pores, few, if any, microscopic pores will be present, so that the sponge produced will be hard or horny, and will not have the ability to absorb large amounts of water.

The use of boiling salt solutions and other methods for coagulation by the external application of heat to a sponge mass also is unsatisfactory due to the difficulty of securing penetration of the coagulation action into the interior of the sponge mass. The external portions of the sponge mass are substantially completely coagulated in a short time, but due to the low heat conductivity of the mass, it takes a considerable length of time, such as 12 hours or more, for the temperature in the interior of the sponge mass to rise sufficiently high to secure an effective coagulating action. Such a prolonged treatment at relatively high temperatures, besides requiring a large consumption of fuel, causes a degradation and weakening of the external portions of the sponge mass. Furthermore the slow transfer of heat from the outside to the inside of the mass permits the viscose in the inside of the mass to ripen excessively prior to its coagulation, with the result that the internal sections of the sponge shrink considerably and thereby deleteriously affect the quality of the sponge.

It is therefore an object of the present invention to produce a flexible, porous structure having substantially uniform physical and chemical characteristics throughout.

It is another object of the invention to produce flexible, porous structures having satisfactory pore structure both macroscopically and microscopically.

It is another object of this invention to reduce the time necessary for the satisfactory coagulation of cellulosic masses for the production of flexible, porous structures.

It is another object of this invention to produce flexible, porous structures, having satisfactorily uniform physical and chemical characteristics throughout, from viscose.

Other objects of the invention will appear hereinafter.

The objects of the invention are accomplished, in general, by coagulating the cellulosic compositions, containing a pore-forming and a strength-giving material, by means of the heat produced in the composition by its resistance to an electric current.

The details of the invention will be more clearly apparent by reference to the accompanying drawing taken in connection with the following detailed description, in which.

Figure 1:
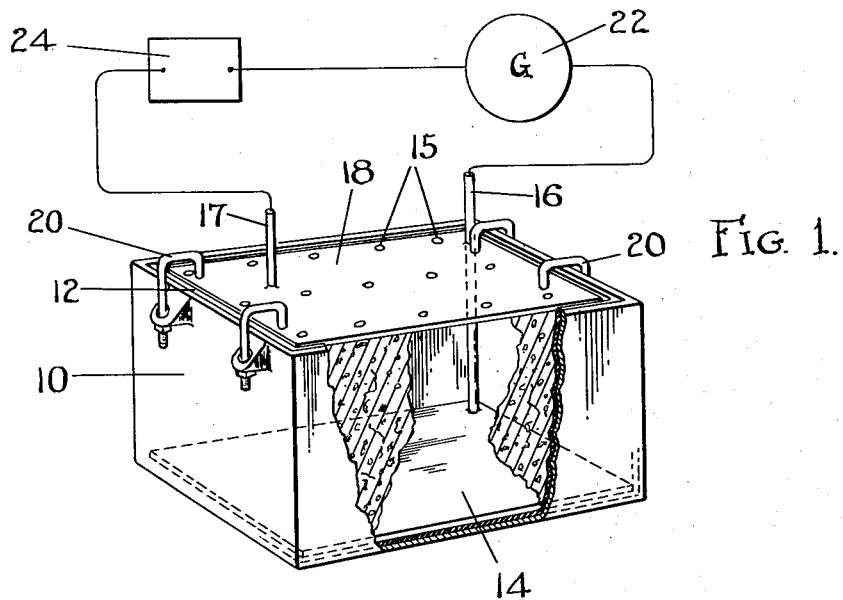
Figure 1 is a perspective view, partially broken away, of a mold provided with electrodes suitable for use in carrying out the invention.

Referring to the drawing, reference numeral 10 designates a mold which is adapted to contain the liquid composition during the coagulation thereof. The mold 10 may be constructed of any desirable material, and is preferably made of comparatively heavy sheet metal, such as steel, or any of the well known corrosion resistant steel alloys. Since it is desirable to place a considerable pressure on the sponge mass after it is placed in the mold 10, and before it is subjected to coagulation, the metal sheeting must be sufficiently heavy to withstand the same. However, it need not be so heavy as to resist bulging or expansion of the mold due to the pressure placed thereon.

The mold 10 is provided with a lining 12 of an electric insulating material whereby to insulate the electrodes from each other. This lining is preferably composed of a yieldable, elastic material which is substantially inert to electricity, heat and chemicals employed in the process. Among suitable materials for the lining of the molds may be mentioned natural rubber, compounded rubber, synthetic rubber, such as, for example, a halogen 2 butadiene 1,3 polymer, or the like. Since the mold is constructed of sheet steel, it will yield somewhat to the pressure applied to the sponge mass, or by the formation of gases in the sponge mass, and the lining in such case should yield with the bulging of the sheet steel without rupturing.

If, however, the mold is made of a heavy, rigid construction, it is possible to employ a lining of comparatively brittle, non-yielding substance, such as ceramic materials, glass, and the like, which are even more resistant to the passage of electrical current, heat and chemicals employed in the present process. In the event of a sufficiently heavy, rigid construction, the mold might even be made entirely of ceramic materials, glass and the like.

The plate electrode 14 substantially covers the bottom of the mold 10 and is positioned in the latter. An insulated lead wire 16 is fastened to one corner of the electrode 14, which lead wire is brought up over the top of the mold along the corner thereof to prevent its being positioned within the subsequently coagulated sponge mass. A metal cover plate 18, preferably provided with holes 15 to allow for the escape of excess fluid generated during the coagulation, closely fits within the mold 10 on top of the liquid sponge mass with which the mold has been filled. The cover is clamped, preferably loosely, in place by means of clamps 20 which may be of any conventional design to hold the cover in place. A second lead wire 17 is connected to the cover member, which member is then adapted to function as the second electrode in the mold. The lead wires are connected to any suitable source of electric current, such as, for example, an alternating current generator 22. The circuit is also preferably provided with a variable resistance or transformer, diagrammatically illustrated by 24.

Figure 2:
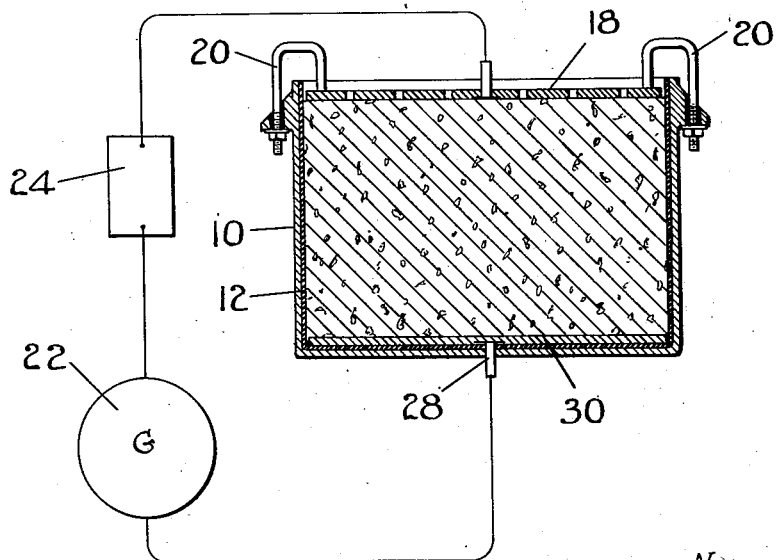
Figure 2 is a vertical sectional view of a modified form of mold.

Figure 2 of the drawing illustrates a modified form of mold in which the lead wire 28 is connected with the plate electrode 30 through the bottom of the mold to prevent adherence of the lead wire to the sponge mass after coagulation thereof.

In the practice of this invention it has been found that a temperature around 100° C. is most satisfactory for ordinary purposes. Such a temperature is sufficiently high to be of good efficiency, that is, it will completely coagulate the mass in an hour or less. It is to be understood, however, that lower temperatures are satisfactory. For example, at 75 to 80° C., complete coagulation will be accomplished in 3 or 4 hours. The lower limit of temperature is to be determined by the efficiency of the process and the fact that with too long a period, the mass will ripen and shrink before coagulation. Temperatures considerably in excess of 100° C. may also be used satisfactorily. In this case the limiting factors are the tendency of the mass to degrade at high temperatures, particularly in the presence of concentrated alkaline salts, and the difficulty of securing temperatures much above the boiling point of water without boiling the mass to dryness. The practical limits of operation, therefore, have been found to be between about 50 and 125° C.

In the preferred embodiment of the invention, alternating current is employed. This may be of any desired frequency, such as that ordinarily available in industrial communities (e. g. 25 or 60 cycles per second). A source of direct current may be employed, however, when direct current is used it is preferred to change the direction of flow of the current at appropriate intervals, for example, one to five second intervals. The direction should be changed as often as reasonably necessary in order to avoid undesirable local segregation of acid at one pole and base at the other pole which will result from decomposition of the ionized salt in the mass.

At the start of the process it is ordinarily possible to employ electrical energy of comparatively high voltage, such as 110 to 220 volts or even higher. The voltage employed will depend, of course, upon the dimensions of the mold and the specific resistance of the sponge mass. This is due to the fact that the mass at this stage has a very high resistance and there will therefore be a relatively low amount of current passing through the mass with a given voltage applied. As the action proceeds, however, the temperature is sufficient to melt the sodium sulfate decahydrate crystals usually employed, so that the conductivity of the mass increases. Inasmuch as the crystals melt at the transition point of the salt, or around 32° C., it is seen that the increased conductivity takes place in a relatively short time. Since the heat developed varies directly with the energy transmitted, and the latter varies directly as the product of the amount of current and the potential drop across the mass, it is seen that the increased amount of current, due to the greater conductivity, passing through the mass at constant potential or voltage develops a higher temperature in the mass. The higher temperature causes the water to boil away more quickly, and eventually, if this were allowed to proceed to its conclusion, the mass would become completely dry.

This condition ordinarily is objectionable and may be overcome to some extent by frequently or continuously adding water or salt solution to keep the temperature down to the required value. This, of course, necessitates the consumption of an unnecessary amount of current, which it is desired to avoid, if possible.

It is preferred therefore to reduce the voltage of the current passing through the mass as the coagulation proceeds in order that the amount of heat being supplied per unit of time may remain substantially constant throughout the coagulation process, and of such value that it is just sufficient to keep the temperature around 100° C., so that the water will boil away relatively slowly. Under proper conditions, it is possible to so regulate the above conditions that only a relatively small amount of water, or none at all need be added during the process. The voltage may be reduced continuously or in steps, as desired.

In the practice of this invention, a sponge mass is introduced into the mold. The mass is then subjected to pressure in a well known manner by any suitable means in order to eliminate air bubbles and produce proper continuity of pores by bringing the crystals into closer relationship. After pressing, the electrical circuit is closed, and an alternating current is passed through the mass until it is substantially completely coagulated.

After the sponge mass has been satisfactorily coagulated by means of the electric current it may be removed from the mold and subjected to further operations. The coagulated sponge may, for example, be washed and/or submitted to other liquid treatments, such as are described in the above mentioned co-pending application to Banigan, Serial No. 26,082. They may then be dried and cut up into individual sponges.

*Example*

The following example illustrates one preferred method of carrying out the invention, it being understood that the invention is not to be limited thereto. A sponge mass is formed comprising the following mixture:

|  | Pounds |
|---|---|
| 20% viscose | 160 |
| Vegetable fibers | 16 |
| Glauber's salt | 1,200 |

A portion of this mass is introduced into a mold constructed as above described and the inside dimensions of which are 20 inches in each direction. After subjecting the mass to the necessary pressure in order to form it into the required shape and eliminate gases contained therein, sixty cycle current at 110 volts is passed through the mass. After maintaining the voltage constant for a period of 15 minutes it is continuously and evenly reduced until at the end of 30 minutes from the beginning of the process, it has reached a value of 27½ volts. The voltage is kept constant at this value for another 30 minutes, at the end of which period the sponge mass is completely and uniformly coagulated and regenerated without being damaged at any section thereof. The mass is then washed, treated and dried, as desired.

The term "coagulation" as used throughout the specification and claims includes generally the conversion of the pressed mass into its ultimate composition, and specifically includes the regeneration of the viscose into cellulose.

Sponges produced in accordance with this invention have been observed to be of measurably superior quality to those heretofore produced, particularly from the point of view of strength and softness. This improvement has been secured due to the elimination of certain injurious conditions of prior methods, for example, (1) aging in the interior of the mass before coagulation resulting in shrinkage and deterioration, and (2) subjection of the exterior of the mass to a high temperature for a long period of time, also resulting in deterioration. The mass is uniformly coagulated throughout and therefore a sponge of uniform quality is produced.

In addition to the improvement in quality, there is a saving in coagulation time and consequently in equipment necessary. Finally, the salt employed as a pore-forming material is not diluted with a coagulant, and the salt recovery problem is therefore simplified.

Since it is obvious that various changes and modifications may be made in the above description without departing from the nature and spirit thereof, it is understood that the invention is not to be limited thereto except as set forth in the appended claims.

I claim:

1. In the production of flexible, porous structures free from objectionable internal shrinkage and having a sufficient number of microscopic pores to present a soft hand and to absorb large amounts of water, the steps comprising mixing viscose with a pore-forming salt and passing an electric current through said mixture whereby to coagulate the viscose by heat produced by the resistance of the mass to said electric current, and whereby to prevent excessive ripening of the viscose at the interior of the mixture.

2. The process described in claim 1, further characterized in that said electric current is an alternating electric current and the energy supplied to said mass is maintained substantially constant.

3. In the production of flexible, porous structures free from objectionable internal shrinkage and having a sufficient number of microscropic pores to present a soft hand and to absorb large amounts of water, the steps comprising mixing viscose with a pore-forming salt, placing said mixture in a receptacle, positioning electrodes in contact with the mixture at opposite sides thereof, and passing an alternating current from one electrode to the other electrode through said mixture whereby to prevent excessive ripening of the viscose at the interior of the mixture.

4. The process described in claim 3, further characterized in that the voltage of said current is continuously and evenly reduced in direct proportion to the reduction of the resistance of said mixture to said current.

NORMAN A. CRAIGUE.